(12) United States Patent
Saenz

(10) Patent No.: US 11,765,241 B1
(45) Date of Patent: *Sep. 19, 2023

(54) USER ATTRIBUTE VALIDATION BASED ON LOCATION REQUESTS

(71) Applicant: PARKLINQ CORPORATION, Honolulu, HI (US)

(72) Inventor: Tyler D. Saenz, Honolulu, HI (US)

(73) Assignee: PARKLINQ CORPORATION, Honolulu, HI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/153,263

(22) Filed: Jan. 11, 2023

Related U.S. Application Data

(63) Continuation of application No. 17/935,026, filed on Sep. 23, 2022.

(51) Int. Cl.
*G06F 15/173* (2006.01)
*H04L 67/306* (2022.01)
*H04L 67/52* (2022.01)
*G06Q 50/10* (2012.01)

(52) U.S. Cl.
CPC ........... *H04L 67/306* (2013.01); *G06Q 50/10* (2013.01); *H04L 67/52* (2022.05)

(58) Field of Classification Search
CPC ....... H04L 67/306; H04L 67/52; G06Q 50/10; H04W 4/02; H04W 4/021; H04W 4/029
USPC ......................................................... 709/223
See application file for complete search history.

(56) References Cited

U.S. PATENT DOCUMENTS

2014/0379441 A1* 12/2014 Avendano .......... G06Q 20/3255
705/13

* cited by examiner

*Primary Examiner* — Alan S Chou
(74) *Attorney, Agent, or Firm* — Knobbe, Martens, Olson & Bear, LLP

(57) ABSTRACT

Aspects of the present application correspond to processing of requests for user attribute information. One or more computing devices can transmit request associated with access to an identified location that include at least one captured information associated with an identified user. A user attribute information request processing service processes the requests based on location profile according to verified attribute information associated with the captured information. The user attribute information request processing service then generates a processing result responsive to the request, such as identifying financial rate information based on the verified attribute information.

22 Claims, 8 Drawing Sheets

USER ATTRIBUTE VALIDATION BASED ON LOCATION REQUESTS

CROSS-REFERENCE TO RELATED APPLICATION

This application is a continuation of U.S. application Ser. No. 17/935,026 filed Sep. 23, 2022, and entitled "USER ATTRIBUTE VALIDATION BASED ON LOCATION REQUESTS". The entirety of which is incorporated herein by reference.

BACKGROUND

Generally described, computing devices and communication networks can be utilized to exchange data and/or information. In a common application, a computing device can request content from another computing device via the communication network. For example, a computing device can collect various data and utilize a software application to exchange content with a server computing device via the network (e.g., the Internet). Such software applications can include general communication applications for accessing the network, such as browser applications. Such general communication applications can access functionality provided network-based services. The software applications can also include custom or specialize software applications configured to implement specific functionality alone or in combination with network-based services.

There are a number of scenarios in which user attributes, such as location-based information, can affect one or more user interactions. For example, in one embodiment, locations may wish to set different financial use rates based on a residency information for a particular user. In another example, access to specific locations or services within a location may further be based on user attributes, such as proximity to the specific location.

BRIEF DESCRIPTION OF THE DRAWINGS

This disclosure is described herein with reference to drawings of certain embodiments, which are intended to illustrate, but not to limit, the present disclosure. It is to be understood that the accompanying drawings, which are incorporated in and constitute a part of this specification, are for the purpose of illustrating concepts disclosed herein and may not be to scale.

DETAILED DESCRIPTION

Figure 1:
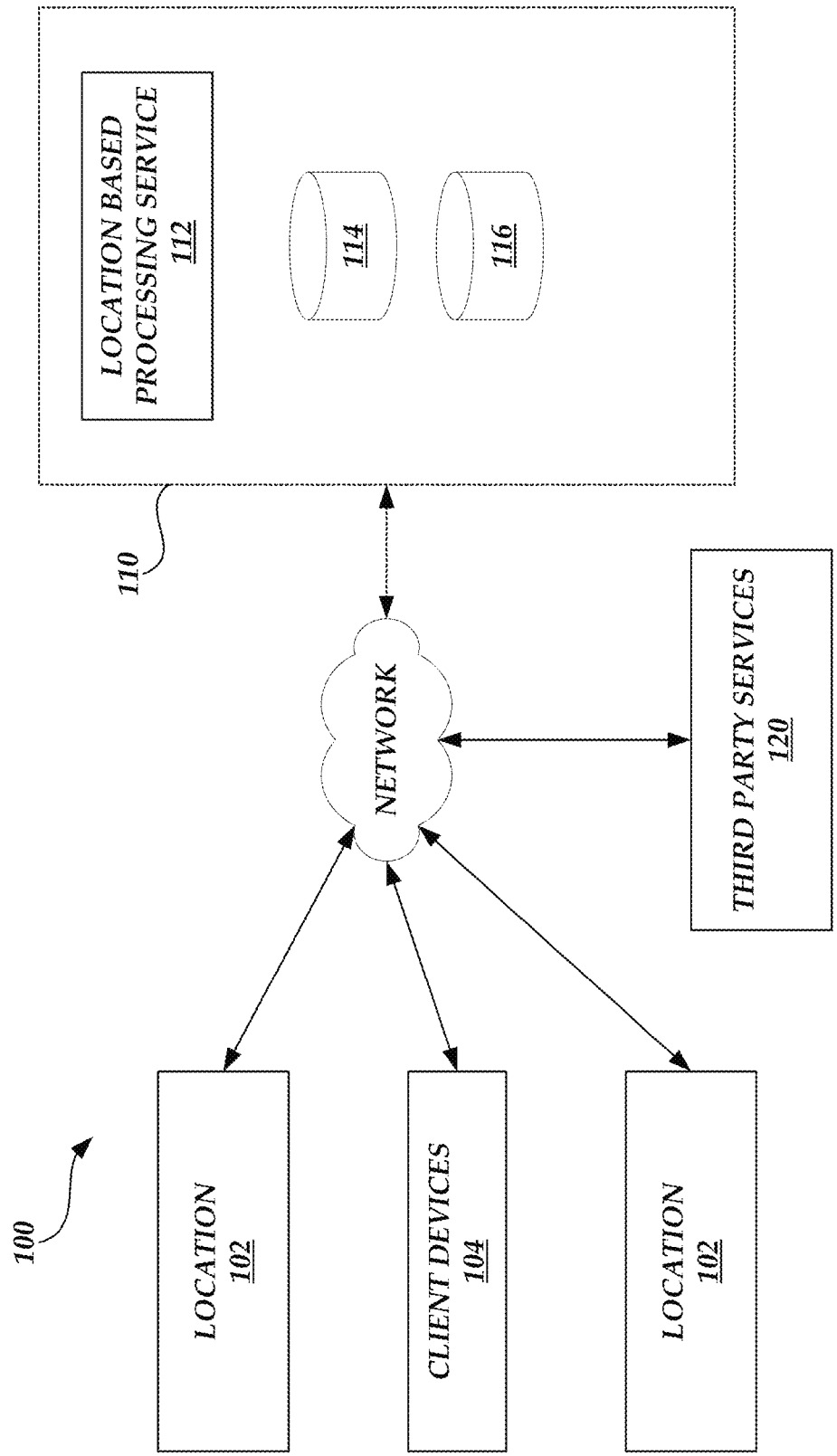
FIG. 1 depicts a block diagram of an illustrative environment for providing and validating user attributes in accordance with one or more aspects of the present application.

Generally described, aspects of the present application correspond to processing of requests for user attribute information. One or more computing devices can transmit request for user attribute information that include at least one captured information associated with an identified user. A user attribute information request processing service processes the requests based on location profile according to verified attribute information associated with the captured information. The user attribute information request processing service then generates a processing result responsive to the request, such as identifying financial rate information based on the verified attribute information.

In accordance with illustrative embodiments, locations within a geographic region may define specific attributes, such as financial rates, based on user attribute information. For example, parking rates within a location, such as a parking lot, may vary based on user location attributes, such as current residency information. In accordance with this example, parking rates may be variable dependent on whether a user requesting to pay parking rates can be characterized as a visitor or characterized as residing within a defined geographic region (e.g., state, county, city, neighborhood, street, house, etc.). In another example, locations within a geographic region may also require specific types of user attribute information in order to gain access to locations (or services) or to achieve available financial rates. In this example, a location corresponding to a boat marina may require a combination of user attributes (e.g., residency) and vehicle attributes (e.g., valid registrations, insurance amounts, etc.).

One approach to provide user attribute verification corresponds to pre-configuration or pre-validation of a user's attribute information, such as via a submission and approval process. Such approaches are typically time consuming and require significant advanced notice in order to complete the pre-configuration/pre-approval process. Additionally, such approaches are typically limited to scenarios in which the location subject to pre-configuration/pre-approval is known in advance and in which the pre-configuration/pre-approval criteria is also known in advance and static in nature. For example, approaches in which a fixed computing device may be able to obtain limited customer information is generally not efficient for allowing customers to utilize submission processes for different locations corresponding to different geography regions. Such approaches are generally inefficient in being able to properly process dynamically changing criteria, such as varying financial criteria, dynamically changing geographic criteria, changes in the underlying information used to validate user location attribute information, and the like. Accordingly, pre-approval/pre-configuration processes can be further deficient in not being able to dynamically collect necessary information or associating the collection of user attribute information contemporaneously with the intended access or use of the location (e.g., associating the submission/verification of user attribute information).

To address, at least in part, the above-described inefficiencies, aspects of the present application correspond to processing of requests for user attribute information. More specifically, one or more aspects of the present application correspond to processing of requests for user location attribute information. One or more computing devices can obtain an instantiation of a request for user attribute information, such as a request for financial criteria (or validation of financial criteria) based on user location attribute information. The request for user attribute information can include at least one captured information associated with an identified user, such as an image depicting a portion of user identification card(s), mailing information, and the like. Illustratively, the image can depict information that includes location information, such as mailing address, city of residency, state of residency, country of residency, etc. The captured information can also include additional or alternative forms of capture information, including, but not limited to, bar code information, positioning information (e.g., global positioning system (GP S) information), electronically transmitted information/identifiers, and the like.

A user attribute information request processing service receives the requests and identifies location profile(s) based on the received request. The user attribute information request processing service also verifies attribute information associated with the captured information, such parsing the image data or other data to obtain location information/attributes. The user attribution information processing service can also validate the parsed information, such as by matching biometric data or image data. The user attribute information request processing service then generates a processing result responsive to the request, such as identifying financial rate information based on the verified attribute information. The processing result can be utilized to complete one or more transactions. Additionally, the processing result (e.g., financial rate information) can be associated with expiration criteria.

Although the various aspects will be described in accordance with illustrative embodiments and combination of features, one skilled in the relevant art will appreciate that the examples and combination of features are illustrative in nature and should not be construed as limiting. More specifically, aspects of the present application may be applicable with various types of client devices, location attributes, captured user attribute information, and the like. Accordingly, the illustrative examples should not be construed as limiting.

FIG. 1 depicts a block diagram of an illustrative environment 100 for collecting, processing and using user attribute information in accordance with one or more aspects of the present application. The environment 100 is a logical representation of one or more physical objects, articles, devices, components, etc. The environment 100 can a set of physical locations, which are represented generally as locations 102. Illustratively, a location can be physical property, such as parking lots, buildings, marinas, parks, streets, pathways, etc. In one embodiment, the locations 102 are not associated with any form of computing devices. In other embodiments, as illustrated in FIG. 1, the locations 102 may have one or more computing devices that can have some form of communication with a communication network. As will be described in detail below, the locations 102 may be associated with some form of information distribution mechanism, both of physical or electronic, to provide computing devices with network address information for accessing network services. For example, the locations can include bar code information, near field communication (NFC) information, etc. that provides access to communication network addressing or other contact information.

The environment 100 can also include one or more client devices 104, and a network service 110. Illustratively, the computing devices 104, as depicted in FIG. 1, can be any computing device such as a desktop, laptop, personal computer, tablet computer, wearable computer, server, personal digital assistant (PDA), hybrid PDA/mobile phone, mobile phone, smartphone, set-top box, voice command device, digital media player, and the like. The computing devices 104 may execute an application (e.g., a browser, a stand-alone application, etc.) that allows a user to access interactive user interfaces, view images, analyses, aggregated data, and/or the like as described herein. Computing devices 104 may represent standalone computing devices or independent computing devices. Computing devices 104 may also represent computing processing functionality integrated into other devices or components, such as computing device functionality accessible in a vehicle. Illustrative components of the computing devices 104 will be described in FIG. 2B.

Illustratively, the various aspects associated with the network service 110 can be implemented as one or more components that are associated with one or more functions or services. The components may correspond to software modules implemented or executed by one or more external computing devices, which may be separate stand-alone external computing devices. Accordingly, the components of the network service 110 should be considered as a logical representation of the service, not requiring any specific implementation on one or more external computing devices.

Illustratively, the network service 110 can include a plurality of network-based services that can provide functionality responsive to requests based on location profile according to verified attribute information associated with the captured information. As illustrated in FIG. 1, the network-based services 110 can include a user attribute information request processing service 112 that processes requests from client devices 104. The network-based service can include a plurality of data stores for maintaining various information associated with aspects of the present application, including a profile data store 114 and user information data store 116. The data stores in FIG. 1 are logical in nature and can be implemented in the network service 110 in a variety of manners. Illustrative components of the user attribute information request processing service 112 will be described with regard to FIG. 2A.

Network 106, as depicted in FIG. 1, connects the devices and modules of the system. The network can connect any number of devices. A network 106 can comprise any combination of wired and/or wireless networks, such as one or more direct communication channels, local area network, wide area network, personal area network, and/or the Internet, for example. In some embodiments, communication between the client devices 104 and computing devices associated with locations 102 may be performed via a short-range communication protocol, such as Bluetooth, Bluetooth low energy ("BLE"), and/or near field communications ("NFC"). Communication between the client devices 104 and the service provider 110 can occur via one or more secured networks, such as a local area network that communicates securely via the Internet.

The environment 100 can further include one or more third party services 120 that can include any one of a number of services/entities that may be configured to either provide inputs to the network service 110 or receive processing results based on process user attribute processing requests. By way of illustrative example, the third-party services 120 can provide one or more data/information that can be utilized to identify individuals, such as licensing authorities, identity providers, etc. The one or more third party services 120 can also include service providers that can provide additional information that may be utilized in processing user attribute requests, such as insurance providers, car rental agencies, banking/financial providers, landlords/location management authorities, and the like. The third-party services 120 further include entities that can utilize processing results, such as security providers, financial providers, car rental agencies, landlord/location management authorities, etc.

Figure 2A:
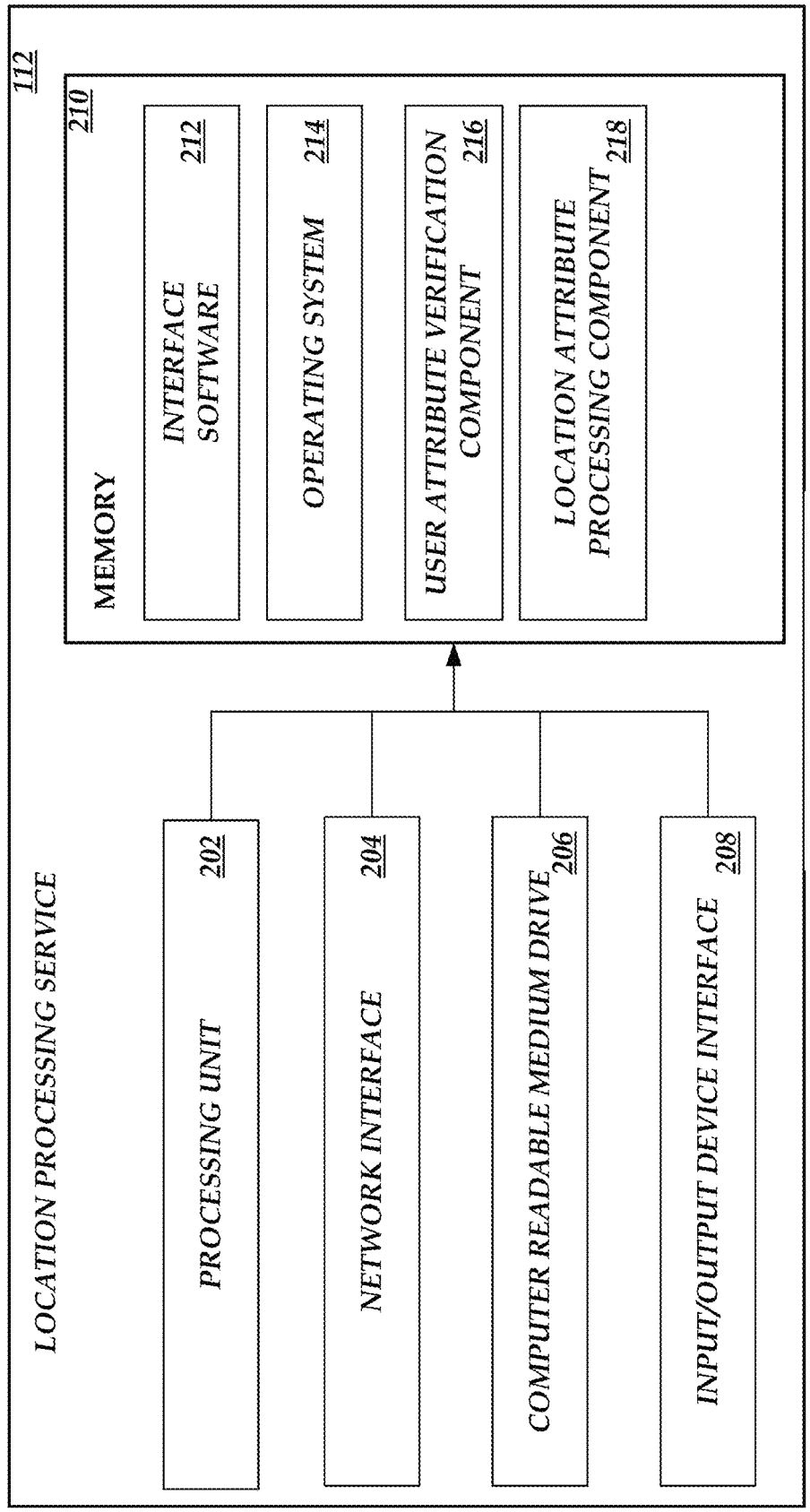
FIG. 2A depicts an illustrative architecture for implementing a location processing service in accordance with aspects of the present application.

With reference now to FIG. 2A, an illustrative architecture for implementing the user attribute information request processing service 112 on one or more local resources or a network service will be described. The user attribute information request processing service 112 may be part of components/systems that provide functionality associated with the machine learned algorithms for object recognition, navigation, locations services, and the like.

The architecture of FIG. 2A is illustrative in nature and should not be construed as requiring any specific hardware or software configuration for the user attribute information request processing service 112. The general architecture of the user attribute information request processing service 112 depicted in FIG. 2A includes an arrangement of computer hardware and software components that may be used to implement aspects of the present disclosure. As illustrated, the user attribute information request processing service 112 includes a processing unit 202, a network interface 204, a computer readable medium drive 206, and an input/output device interface 208, all of which may communicate with one another by way of a communication bus. The components of the user attribute information request processing service 112 may be physical hardware components or implemented in a virtualized environment.

The network interface 204 may provide connectivity to one or more networks or computing systems, such as the network of FIG. 1. The processing unit 202 may thus receive information and instructions from other computing systems or services via a network. The processing unit 202 may also communicate to and from memory 210 and further provide output information for an optional display (not shown) via the input/output device interface 208. In some embodiments, the user attribute information request processing service 112 may include more (or fewer) components than those shown in FIG. 2A.

The memory 210 may include computer program instructions that the processing unit 202 executes in order to implement one or more embodiments. The memory 210 generally includes RAM, ROM, or other persistent or non-transitory memory. The memory 210 may store interface software 212 and an operating system 214 that provides computer program instructions for use by the processing unit 202 in the general administration and operation of the user attribute information request processing service 112. The memory 210 may further include computer program instructions and other information for implementing aspects of the present disclosure. For example, in one embodiment, the memory 210 includes a user attribute verification component 216 for receiving and processing user attribute information as described herein. Illustratively, the user attribute verification component 216 can include executable code or components that facilitate the identification of submitted user attribute information (e.g., in captured information submitted by a client device 14) and validation or verification of the information. The memory 210 can further include a location attribute processing component 218 for processing the processed user attribute information according to location profile information as described herein. Illustratively, the location attribute processing component 218 can generate processing results related to financial rates, authorization of access, notifications and the like.

Figure 2B:
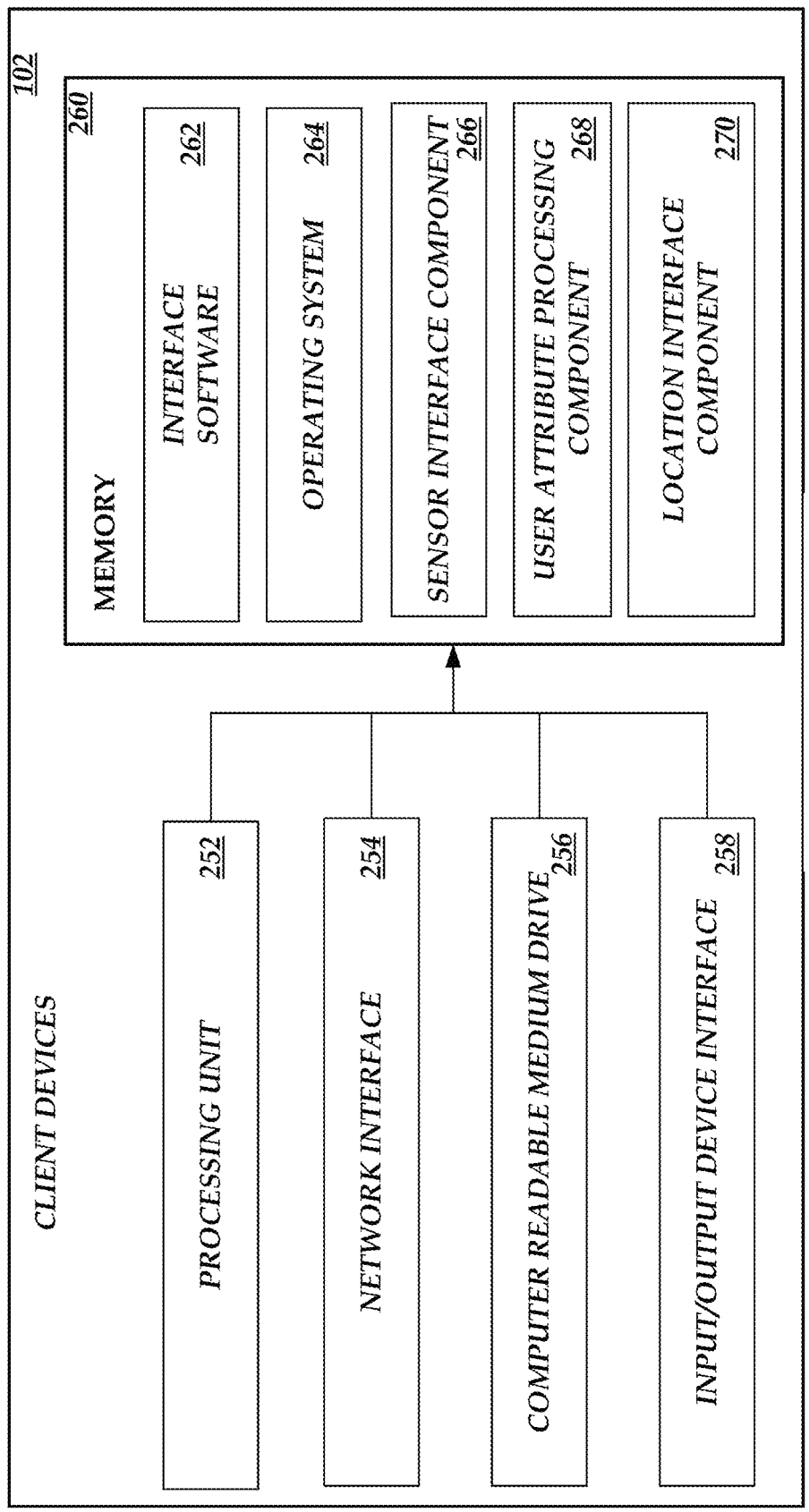
FIG. 2B depicts an illustrative architecture for implementing a client computing device in accordance with aspects of the present application.

With reference now to FIG. 2B, an illustrative architecture for implementing the user attribute information request processing service 112 on one or more local resources or a network service will be described. The client device 104 may be part of components/systems that provide functionality associated with the machine learned algorithms for object recognition, navigation, locations services, and the like.

The architecture of FIG. 2B is illustrative in nature and should not be construed as requiring any specific hardware or software configuration for illustrative client devices 104. The architecture of FIG. 2B should be considered illustrative in nature and should be construed as limiting as to the computing devices that correspond to a client device 104. The general architecture of the client device 104 depicted in FIG. 2B includes an arrangement of computer hardware and software components that may be used to implement aspects of the present disclosure. As illustrated, the client device 104 includes a processing unit 252, a network interface 254, a computer readable medium drive 256, and an input/output device interface 258, all of which may communicate with one another by way of a communication bus. The components of the client device 104 may be physical hardware components or implemented in a virtualized environment.

The network interface 254 may provide connectivity to one or more networks or computing systems, such as the network of FIG. 1. The processing unit 252 may thus receive information and instructions from other computing systems or services via a network. The processing unit 252 may also communicate to and from memory 260 and further provide output information for an optional display (not shown) via the input/output device interface 258. In some embodiments, the client device 104 may include more (or fewer) components than those shown in FIG. 2B.

The memory 260 may include computer program instructions that the processing unit 252 executes in order to implement one or more embodiments. The memory 260 generally includes RAM, ROM, or other persistent or non-transitory memory. The memory 260 may store interface software 262 and an operating system 264 that provides computer program instructions for use by the processing unit 252 in the general administration and operation of the client device 104. The memory 260 may further include computer program instructions and other information for implementing aspects of the present disclosure. Illustratively, the computing programs or computer program instructions may be embodied as executable code executed by a general application, such as a browser application or other executable environment. In this aspect, the client device 104 is not required to download or maintain specific-purpose applications. In other embodiments, the computing programs in the memory 260 may be embodied as stand-alone applications or permanent/semi-permanent code.

In one embodiment, the memory 260 includes a sensor interface component 266 for receiving or capturing user attribute information that can be included as part of the user attribute information processing requests. The sensor interface 266 can obtain image data for capturing image data depicting identification information (e.g., identification cards, mail, etc.). In other examples, the sensor interface 226 can obtain information embedded in bar codes or transmitted via NFC. In still other examples, the sensor interface 226 can obtain information transmitted via radio-based communications with other computing devices.

Additionally, the memory 260 can include a user attribute processing component 268 for locally receiving and processing user attribute information as described herein. Similar to the functionality described above with regard to the user attribute verification component 216, the user attribute verification component 266 can include executable code or components that facilitate the identification of submitted user attribute information (e.g., in captured information submitted by a client device 14) and validation or verification of the information. This component may be omitted in some embodiments. The memory 260 can further include a location interface component 270 for processing processing results generated by the user attribute information request processing service 112, such as completing transactions using financial rate information, processing and displaying notifications, transmitting additional information, and the like.

Figure 3A:
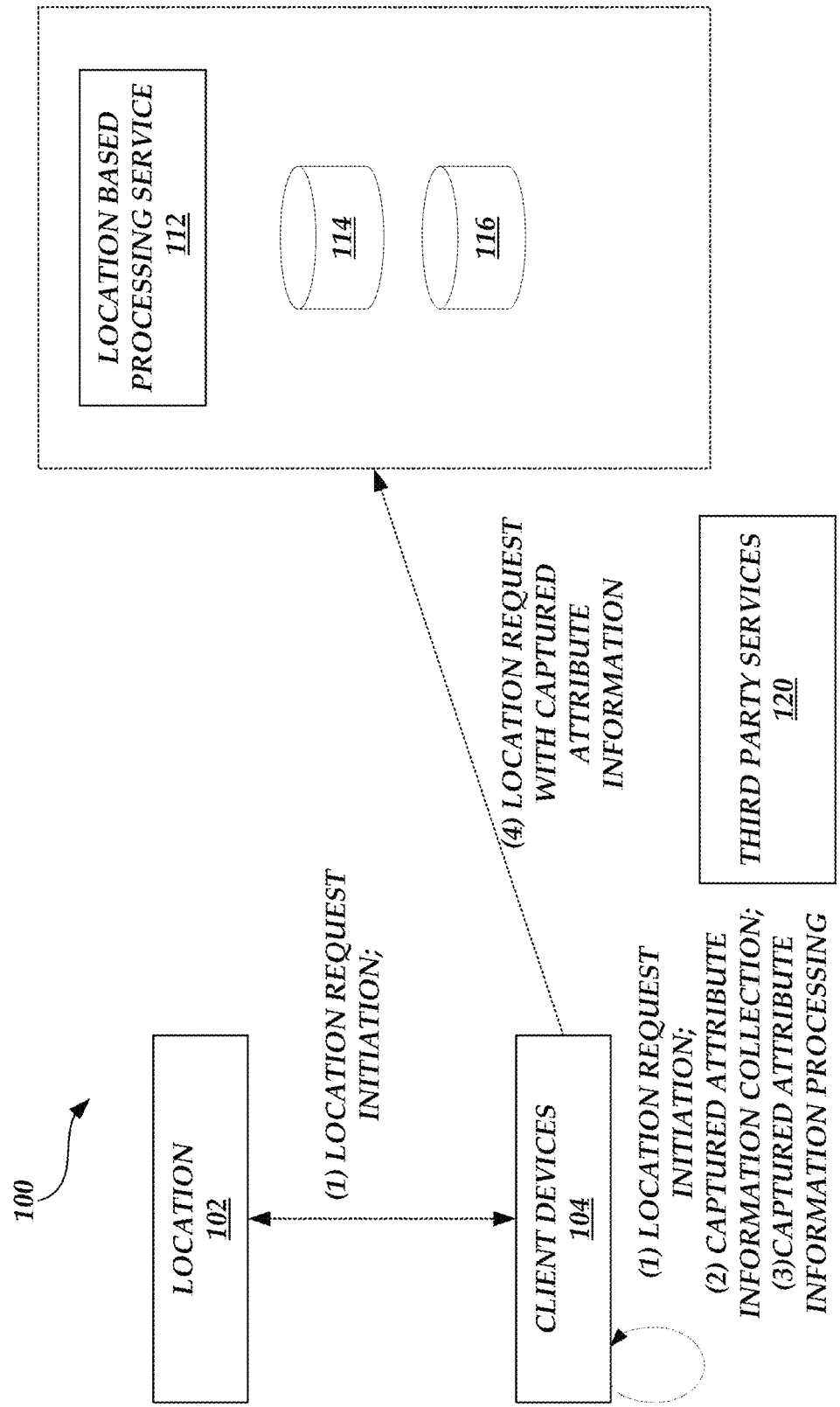
FIGS. 3A-3C are block diagrams of the illustrative environment of FIG. 1 illustrating the initiating and processing of user attribute information request in accordance with illustrative embodiments.
Figure 3B:
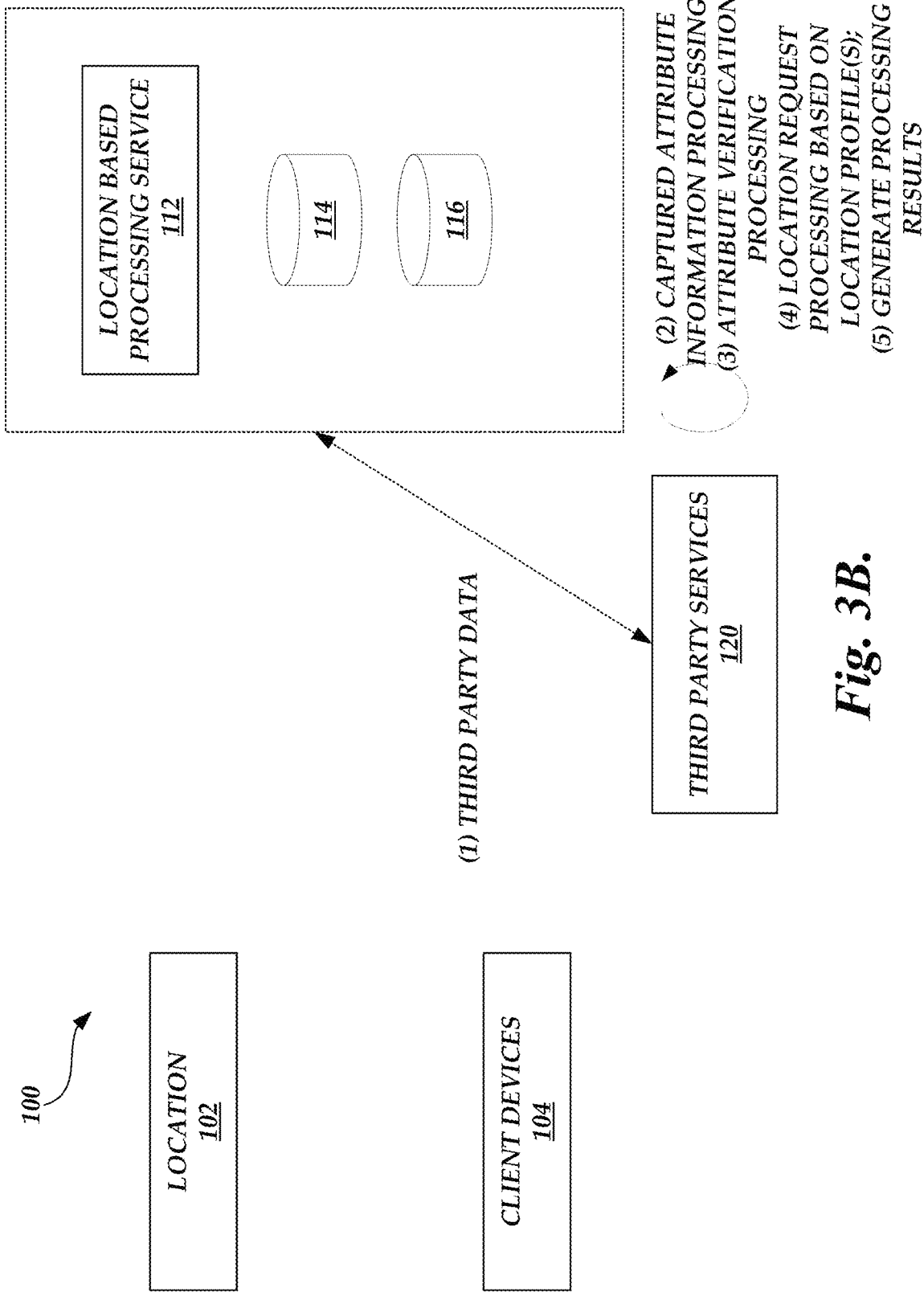
Figure 3C:
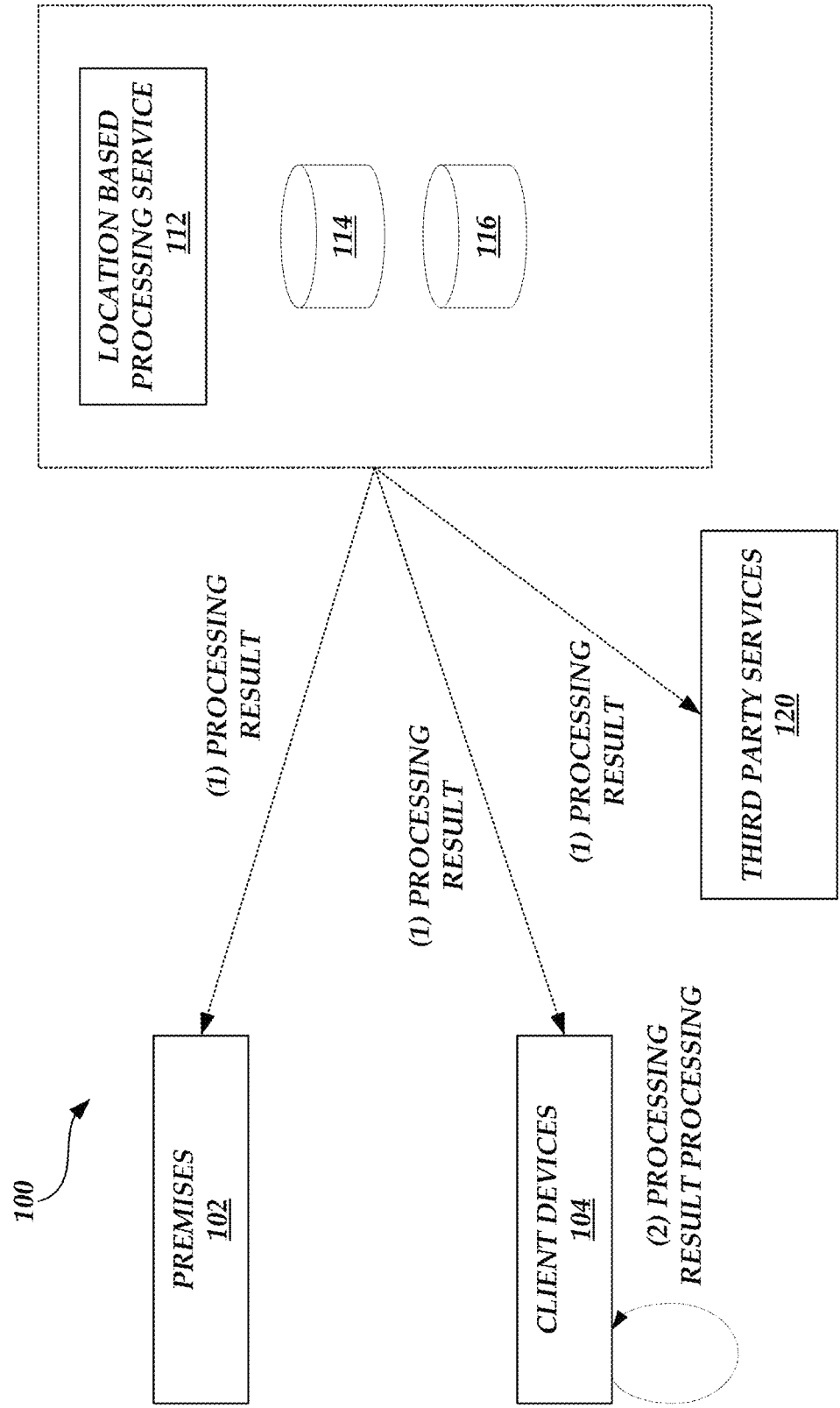

Turning now to FIGS. 3A-3C, illustrative interactions for the components of the environment to generate and process user attribute information processing requests will be described. For purposes of illustration, FIGS. 3A-3B illustrate an interaction between a single client device 104, a single location 102 and the network service 110. Accordingly, in some aspects, the interaction between a plurality of client devices 104, a plurality of locations 102 and the network service 110 may occur in parallel or sequentially. At (1), client device 104 initiates a location request process. Illustratively, the client device 104 can initiate the location request process by accessing a web page (via a browser application) or selection of a software application. The client device 104 can illustratively receive information from the location 102 such as network address information, location identifiers, etc. Such information may be manually provided (e.g., signage) or via electronic transmissions (e.g., bar codes, vision information, NFC, etc.).

At (2), the client device 104 may be configured to collect and capture user attribute information that will be included as part of the request process. Illustratively, the captured information associated with an identified user, such as an image depicting a portion of user identification card(s), mailing information, and the like. Illustratively, the image can depict information that includes location information, such as mailing address, city of residency, state of residency, country of residency, etc. The captured information can also include additional or alternative forms of capture information, including, but not limited to, bar code information, positioning information (e.g., global positioning system (GPS) information), electronically transmitted information/identifiers, and the like. The captured information can also include biometric information, such as facial scan data, fingerprint data, eye scan data (e.g., iris patterns), voice pattern scans, and the like.

At (3), the client device 104 can process the collected, captured data (e.g., sensor data). For example, the client device 104 can implement processes for randomizing the collected data, encrypting the data, error correction, data normalization, and the like. The client device 104 can also obtain supplemental information, such as from third party services 120. Still further, the client device 104 can also conduct some form of authentication or authorization processes, such as independent security assessments, facial mapping, and the like.

At (4), the client device 104 transmits the user attribute processing request with the captured information. Illustratively, the request can be facilitated through the browser application or stand-alone component. The request can include the captured information as described above, The request can also include additional information utilized in the processing of the request, such as user profile identifiers, location identifier, location information (e.g., GPS information), account identifiers, and the like. The transmissions of the request can correspond to one or more application programming interfaces ("APIs").

With reference now to FIG. 3B, the illustrative processing of the user attribute processing request will be described. At (1), the user attribute information request processing service 112 can receive one or more third party data from third party services 120. As previously described, in one aspect, the third-party services can include any one of a number of services/entities that may be configured to either provide inputs to the network service 110. By way of illustrative example, the third-party services 120 can provide one or more data/information that can be utilized to identify individuals, such as licensing authorities, identity providers, etc. The one or more third party services 120 can also include service providers that can provide additional information that may be utilized in processing user attribute requests, such as insurance providers, car rental agencies, banking/financial providers, landlords/location management authorities, and the like. In some embodiments, the network service 110 may not interact or otherwise be provided third-party data.

At (2), the user attribute information request processing service 112 can processing the received request. In one aspect, the user attribute information request processing service 112 can parse the received attribute request to determine the captured user attribute information. For example, the user attribute information request processing service 112 can determine/distinguish between different types of captured information, etc. The user attribute information request processing service 112 can further decrypt or validate the accuracy/validity of the captured information. The user attribute information request processing service 112 can also provide error correction, duplicate removal, normalization and the like.

At (3), the user attribute information request processing service 112 processes the captured information. Illustratively, for captured image data, the user attribute information request processing service 112 can conduct image analysis or other analytical process to identify information depicted in the image data. For example, the user attribute information request processing service 112 can attempt to extract address information (complete or partial) as verification of the user location attributes. In another example, the user attribute information request processing service 112 can attempt to locate user physical attribute information from the image data to attempt to match physical appearance of the user (e.g., using third-party image data). In another aspect, the user attribute information request processing service 112 can implement additional processing to process biometric information included in the captured information submitted in the user attribute request. The user attribute information request processing service 112 can also utilize third-party services 120 to complete the process. Additionally, the user attribute information request processing service 112 can maintain some form of caching or other verification information (e.g., hash values) to allow for re-use of previously executed processing.

At (4), the user attribute information request processing service 112 identifies one or more location profiles. Illustratively, the location profiles correspond to one or more processing rules or structure logic that is used to evaluate the verified user attribute information. For example, location profiles can provide for financial rate information (e.g., parking rates) based on determined residency information. The location profiles can also select from different potential rates based on a plurality of factors/criteria, such as time of day, frequency of use, user classifications, (e.g., preferred customers), and the like. In other embodiments, the location profile can be used to authorize an action, such as provide permissions, notifications or to physically provide access to goods/services. The location profiles may be unique to an individual location, such as sorted by location identifiers or corresponding to submit geographic identifiers/coordinates. In other embodiments, the location profile may apply to sets of locations, such as based on organizational criteria (e.g., a company-specific location profile for one or more profiles). Still further, the location profiles can include default profiles or a single profile attributable for all locations.

At (5), the user attribute information request processing service 112 can generate processing results. In one embodiment, the processing results can include the generation/identification of the determine financial rate information that will be utilized in subsequent transactions associated with the corresponding location. For example, the user attribute information request processing service 112 can return the parking rate information that will be utilized to charge for parking. In another embodiment, the processing results can include notifications, access codes, communications, and the like. Still further, in some embodiments, the processing results can include additional executable code or instructions that can be executed by the client devices 104, such as for completing transaction or causing the execution of additional actions.

Turning now to FIG. 3C, after generating the processing results, at (1), the user attribute information request processing service 112 can transmit the processing result to a plurality of potential recipients, such as the locations 102, client device 104, and third-party services 120. Illustratively, the user attribute information request processing service 112 does not have to transmit to all three and can be configured in various embodiments to cause transmission to any subset of recipients. As previously described, the processing results can include the generation/identification of the determine financial rate information that will be utilized in subsequent transactions associated with the corresponding location. For example, the user attribute information request processing service 112 can return the parking rate information that will be utilized to charge for parking. In another embodiment, the processing results can include notifications, access codes, communications, and the like. For purposes of illustration, in some embodiments, the processing results can include additional executable code or instructions that can be executed by the client devices 104, such as for completing transaction or causing the execution of additional actions. Accordingly, at (2), the client device process/executes the processing result.

Figure 4:
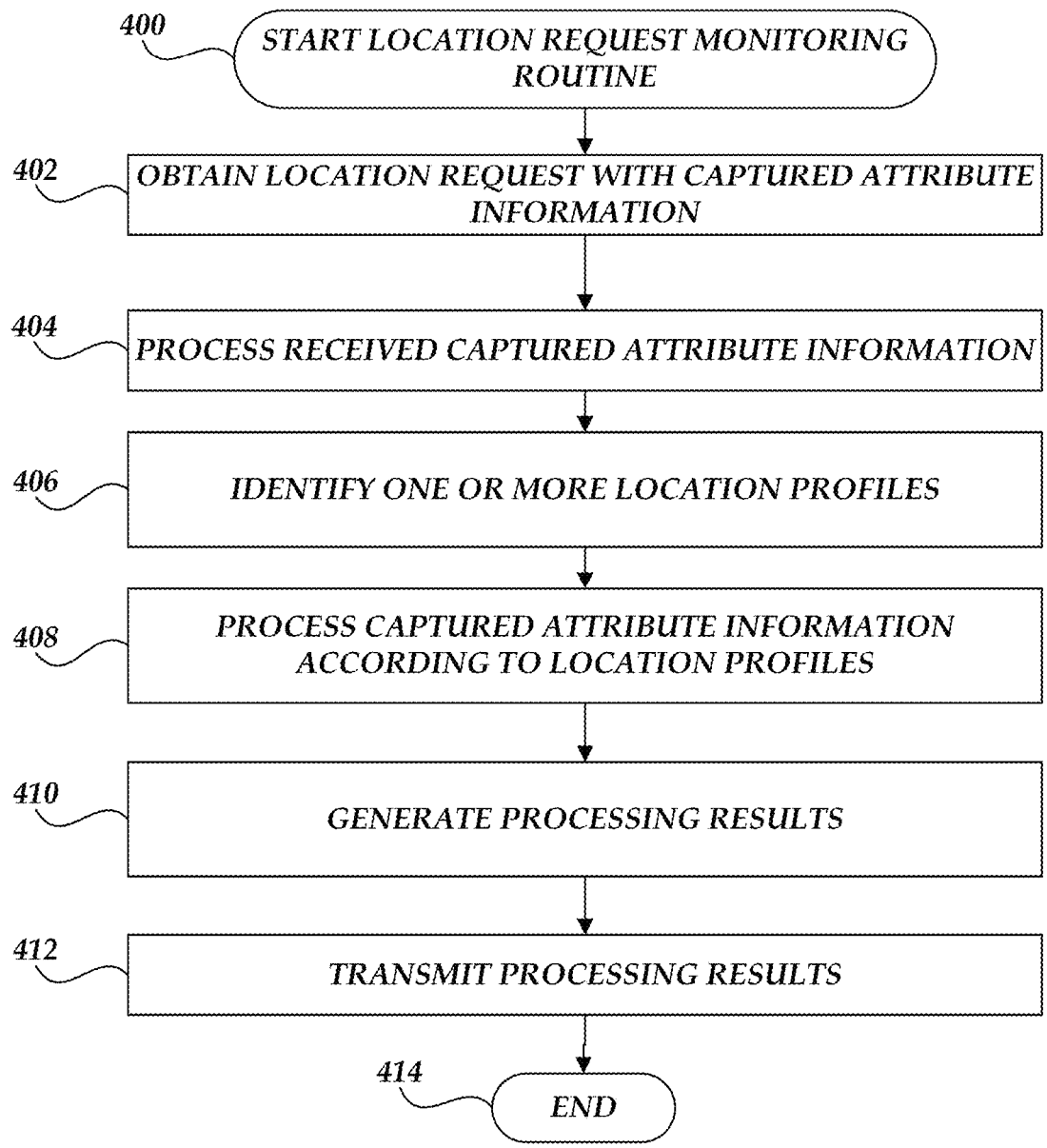
FIG. 4 is a flow diagram illustrative of a location request monitoring routine implemented by a locating processing service in accordance with illustrative embodiments.

Turning now to FIG. 4, a routine 400 for processing location requests will be described. Routine 500 is illustratively implemented by the user attribute information request processing service 112. At block 402, the user attribute information request processing service 112 obtains the request from a client device 104 that includes captured information and other additional information. As previously described, the request can be facilitated through the browser application or stand-alone component. The request can include the captured information as described above, The request can also include additional information utilized in the processing of the request, such as user profile identifiers, location identifier, location information (e.g., GPS information), account identifiers, and the like. The transmissions of the request can correspond to one or more APIs.

Additionally, the user attribute information request processing service 112 can receive one or more third party data from third party services 120. As previously described, in one aspect, the third-party services can include any one of a number of services/entities that may be configured to either provide inputs to the network service 110. By way of illustrative example, the third-party services 120 can provide one or more data/information that can be utilized to identify individuals, such as licensing authorities, identity providers, etc. The one or more third party services 120 can also include service providers that can provide additional information that may be utilized in processing user attribute requests, such as insurance providers, car rental agencies, banking/financial providers, landlords/location management authorities, and the like. In some embodiments, the network service 110 may not interact or otherwise be provided third-party data.

At block 404, the user attribute information request processing service 112 can process the received attribute request. In one aspect, the user attribute information request processing service 112 can parse the received attribute request to determine the captured user attribute information. For example, the user attribute information request processing service 112 can determine/distinguish between different types of captured information, etc. The user attribute information request processing service 112 can further decrypt or validate the accuracy/validity of the captured information. The user attribute information request processing service 112 can also provide error correction, duplicate removal, normalization and the like.

At block 406, the user attribute information request processing service 112 identifies one or more location profiles. Illustratively, the location profiles correspond to one or more processing rules or structure logic that is used to evaluate the verified user attribute information. For example, location profiles can provide for financial rate information (e.g., parking rates) based on determined residency information. The location profiles can also select from different potential rates based on a plurality of factors/criteria, such as time of day, frequency of use, user classifications, (e.g., preferred customers), and the like. In other embodiments, the location profile can be used to authorize an action, such as provide permissions, notifications or to physically provide access to goods/services. The location profiles may be unique to an individual location, such as sorted by location identifiers or corresponding to submit geographic identifiers/coordinates. In other embodiments, the location profile may apply to sets of locations, such as based on organizational criteria (e.g., a company-specific location profile for one or more profiles). Still further, the location profiles can include default profiles or a single profile attributable for all locations.

At block 408, the user attribute information request processing service 112 processes the captured information. Illustratively, for captured image data, the user attribute information request processing service 112 can conduct image analysis or other analytical process to identify information depicted in the image data. For example, the user attribute information request processing service 112 can attempt to extract address information (complete or partial) as verification of the user location attributes. In another example, the user attribute information request processing service 112 can attempt to locate user physical attribute information from the image data to attempt to match physical appearance of the user (e.g., using third-party image data). In another aspect, the user attribute information request processing service 112 can implement additional processing to process biometric information included in the captured information submitted in the user attribute request. The user attribute information request processing service 112 can also utilize third-party services 120 to complete the process. Additionally, the user attribute information request processing service 112 can maintain some form of caching or other verification information (e.g., hash values) to allow for re-use of previously executed processing.

At block 410, the user attribute information request processing service 112 can generate processing results. In one embodiment, the processing results can include the generation/identification of the determine financial rate information that will be utilized in subsequent transactions associated with the corresponding location. For example, the user attribute information request processing service 112 can return the parking rate information that will be utilized to charge for parking. In another embodiment, the processing results can include notifications, access codes, communications, and the like. Still further, in some embodiments, the processing results can include additional executable code or instructions that can be executed by the client devices 104, such as for completing transaction or causing the execution.

Figure 5:
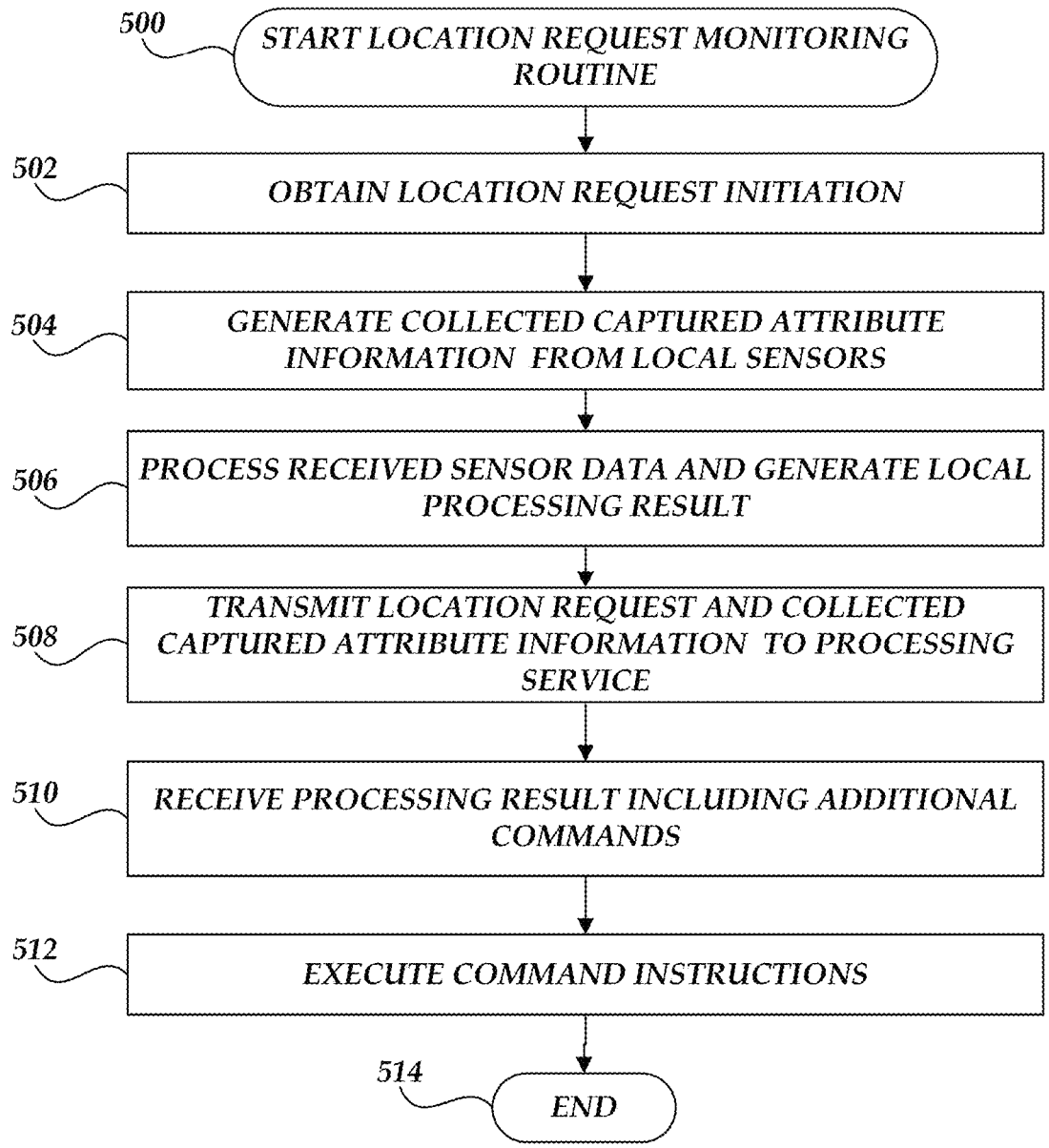
FIG. 5 is a flow diagram illustrative of a location request monitoring routine implemented by a client device in accordance with illustrative embodiments.

With reference to FIG. 5, a routine 500 for processing location requests will be described. Routine 500 is illustratively implemented by client device 104. At block 502, the client device 104 initiates a location request process. Illustratively, the client device 104 can initiate the location request process by accessing a web page (via a browser application) or selection of a software application. The client device 104 can illustratively receive information from the location 102 such as network address information, location identifiers, etc. Such information may be manually provided (e.g., signage) or via electronic transmissions (e.g., bar codes, vision information, NFC, etc.).

At block 504, the client device 104 may be configured to collect and capture user attribute information that will be included as part of the request process. Illustratively, the captured information associated with an identified user, such as an image depicting a portion of user identification card(s), mailing information, and the like. Illustratively, the image can depict information that includes location information, such as mailing address, city of residency, state of residency, country of residency, etc. The captured information can also include additional or alternative forms of capture information, including, but not limited to, bar code information, positioning information (e.g., global positioning system (GPS) information), electronically transmitted information/identifiers, and the like. The captured information can also include biometric information, such as facial scan data, fingerprint data, eye scan data (e.g., iris patterns), voice pattern scans, and the like.

At block 506, the client device 104 can process the collected, captured data (e.g., sensor data). For example, the client device 104 can implement processes for randomizing the collected data, encrypting the data, error correction, data normalization, and the like. The client device 104 can also obtain supplemental information, such as from third party services 120. Still further, the client device 104 can also conduct some form of authentication or authorization processes, such as independent security assessments, facial mapping, and the like.

At block 508, the client device 104 transmits the user attribute processing request with the captured information. Illustratively, the request can be facilitated through the browser application or stand-alone component. The request can include the captured information as described above. The request can also include additional information utilized in the processing of the request, such as user profile identifiers, location identifier, location information (e.g., GPS information), account identifiers, and the like. The transmissions of the request can correspond to one or more APIs.

At block 510, the client device 104 can receive the processing result transmitted by the user attribute information request processing service 112. As previously described, the processing results can include the generation/identification of the determine financial rate information that will be utilized in subsequent transactions associated with the corresponding location. For example, the user attribute information request processing service 112 can return the parking rate information that will be utilized to charge for parking. In another embodiment, the processing results can include notifications, access codes, communications, and the like. Accordingly, at block 512, the client device process/executes the processing result. For example, in some embodiments, the processing results can include additional executable code or instructions that can be executed by the client devices 104, such as for completing transaction or causing the execution of additional actions, such as the generation of bar codes or the generation of access codes via user interfaces or radio signals. At block 514, the routine 500 terminates.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed decision and control algorithms. It is to be understood that the forms of disclosure herein shown and described are to be taken as representative embodiments. Equivalent elements, materials, processes, or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer those two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application.

What is claimed:

1. A system for requests associated with access to an identified location, the system comprising:
    a plurality of mobile computing devices, wherein individual mobile computing devices are configured with a software application generating requests for user attribute information associated with one or more locations;
    one or more computing systems including processing devices and memory, that execute computer-executable instructions, for implementing a user attribute information request processing service operative to:
        obtain, from one or more software applications on mobile computing devices, a request associated with access to an identified location within a geographic area, wherein the request for user location attribute information includes at least one captured information associated with an identified user;
        identify one or more profiles associated with evaluating the request associated with access to an identified location, wherein the one or more profiles define processing rules for determination of financial rate information based on the request associated with access to an identified location, wherein the financial rate information is dynamically selectable based on residency information associated with the request associated with access to an identified location;
        process the request associated with access to an identified location in accordance with the identified one or more profiles, wherein processing the request associated with access to an identified location includes verification of a user attribute based on the at least one captured information associated with an identified user and processing the verified user attribute according to the one or more profiles;
        generate a processing result associated with the processed request associated with access to an identified location, wherein the processing result includes the identification of at least one financial rate information to be applied to the request associated with access to an identified location; and
        transmit the generated processing result responsive to the obtained request associated with access to an identified location.

2. The system as recited in claim 1, wherein the captured information associated with the identified user includes an image depicting an identification card.

3. The system as recited in claim 2, wherein the image depicting the identification card includes at least a portion of address information and wherein processing the request associated with access to an identified location includes verification of a user attribute based on the at least one captured information associated with an identified user includes parsing the depicted address information to verify a location attribute attributable to the identified user.

4. The system as recited in claim 1, wherein the one or more profiles defining processing rules for determination of financial rate information based on the request associated with access to an identified location includes one or more profiles include a plurality of financial rate information dependent, at least in part, on a location attribute attributable to the identified user.

5. The system as recited in claim 4, wherein the one or more profiles defining processing rules for determination of financial rate information based on the request associated with access to an identified location includes one or more profiles include a plurality of financial rate information further dependent, at least in part, on timing information associated with the request associated with access to an identified location.

6. The system as recited in claim 1, wherein the user attribute information request processing service is further operative to cause a processing of financial transactions based on the user attribute information request processing service and the identification of at least one financial rate information to be applied to the request associated with access to an identified location.

7. The system as recited in claim 1, wherein the user attribute information request processing service is further operative to obtain at least one additional information from a third-party services responsive to the request associated with access to an identified location.

8. A method for managing requests associated with access to an identified location, the method comprising:
    obtaining, from one or more mobile computing devices executing a software application, a request associated with access to an identified location, wherein the request associated with access to an identified location corresponds to an identified location within a geographic area and wherein the request associated with access to an identified location includes at least one captured information associated with an identified user;
    processing the request associated with access to an identified location based on identified one or more profiles applicable to the identified location, wherein the one or more profiles dynamically define access to the identified location and wherein processing the request associated with access to an identified location includes verification of a user attribute based on the at least one captured information associated with an identified user and processing the verified user attribute according to the one or more profiles;
    generating a processing result associated with the processed request associated with access to an identified location; and
    transmitting the generated processing result responsive to the obtained request associated with access to an identified location.

9. The method as recited in claim 8 further comprising identifying one or more profiles associated with the identified location, the one or more profiles defining processing rules for determination of financial rate information based on the request associated with access to an identified location.

10. The method as recited in claim 8, wherein the captured information associated with the identified user includes at least one of an image depicting an identification card or biometric data associated with the identified user.

11. The method as recited in claim 10, wherein the image depicting the identification card includes at least a portion of address information and wherein processing the request associated with access to an identified location includes verification of a user attribute based on the at least one captured information associated with an identified user includes parsing the depicted address information to verify a location attribute attributable to the identified user.

12. The method as recited in claim 8, wherein the processing result includes the identification of at least one financial rate information to be applied to the request associated with access to an identified location.

13. The method as recited in claim 12, wherein the one or more profiles defining processing rules for determination of financial rate information based on the request associated with access to an identified location includes one or more profiles include a plurality of financial rate information dependent, at least in part, on a location attribute attributable to the identified user.

14. The method as recited in claim 13 wherein the one or more profiles defining processing rules for determination of financial rate information based on the request associated with access to an identified location includes one or more profiles include a plurality of financial rate information further dependent, at least in part, on timing information associated with the request associated with access to an identified location.

15. The method as recited in claim 12 further comprising causing a processing of financial transactions based on the user attribute information request processing service and the identification of at least one financial rate information to be applied to the request associated with access to an identified location.

16. The method as recited in claim 8, wherein the request associated with access to an identified location includes location information for validating a location attributable to the location request.

17. The method as recited in claim 8, wherein the request associated with access to an identified location processing service is further operative to obtain at least one additional information from a third-party services responsive to the request associated with access to an identified location.

18. A method for managing requests associated with access to an identified location, the method comprising:
   transmitting, to a user attribute processing service, a request associated with access to an identified location, wherein the request associated with access to an identified location corresponds to an identified location within a geographic area and wherein the request associated with access to an identified location includes at least one captured information associated with an identified user;
   obtaining a processing result associated with the processed request associated with access to an identified location, wherein the processing result is based on processing the request associated with access to an identified location based on identified one or more profiles applicable to the identified location and defining access parameters, wherein processing the request associated with access to an identified location includes verification of a user attribute based on the at least one captured information associated with an identified user and processing the verified user attribute according to the one or more profiles; and
   causing completion of at least one additional transaction based on the obtained processing result.

19. The method as recited in claim 18, wherein the captured information associated with the identified user includes at least one of an image depicting an identification card or biometric data associated with the identified user.

20. The method as recited in claim 19, wherein the image depicting the identification card includes at least a portion of address information and wherein processing the request associated with access to an identified location includes verification of a user attribute based on the at least one captured information associated with an identified user includes parsing the depicted address information to verify a location attribute attributable to the identified user.

21. The method as recited in claim 18, wherein the processing result is associated with at least one expiration criteria.

22. The method as recited in claim 21 further comprising causing completion of at least one additional transaction based on the processing result and the determination that the at least one expiration criteria is not satisfied.

* * * * *